Patented Feb. 23, 1954

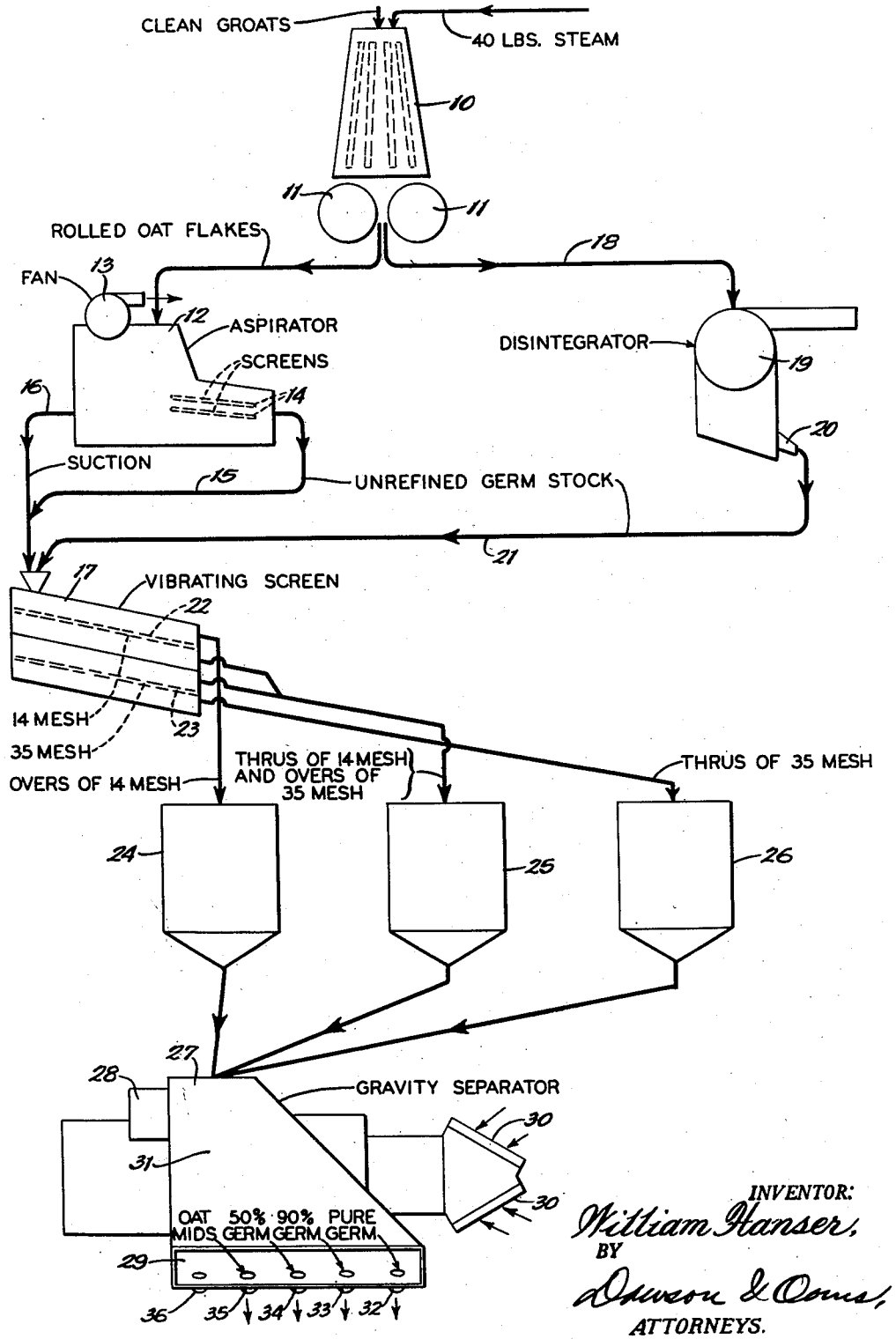

2,670,290

UNITED STATES PATENT OFFICE 2,670,290

PROCESS FOR RECOVERY OF OAT GERM FROM OATS

William F. Hanser, Cedar Rapids, Iowa, assignor to National Oats Company, Cedar Rapids, Iowa, a corporation of Illinois Application March 14, 1952, Serial No. 276,639

6 Claims. (Cl. 99—80)

1

This invention relates to a process for the recovery of oat germ from oats.

The separation or recovery of oat germ from a clean groat product has long presented a problem. A germ product containing oat flake fragments or flour, etc. may be obtained, but a separation to recover substantially pure germ has not been made possible by an economically feasible process. As a result, oat germ, which is a valuable product as a source of vitamines, as providing an extract for anti-oxidant uses, etc., has not been utilized, and the mixture of oat germ and flake fragments has not been utilizable for these important purposes.

An object of the present invention is to provide an inexpensive and effective process for the recovery of substantially pure oat germ free of the contaminating flake fragments, etc. A further object is to provide a means and method for the quick and effective recovery of germ from flaked oats whereby a substantially pure germ product is obtained. Other specific objects and advantages will appear as the specification proceeds.

The invention is shown in an illustrative embodiment by the accompanying drawing, in which there is set out a flow diagram illustrating useful steps in the process.

It is common practice to remove the hulls from raw oats in steam dryers, and after cooling and storing in dry bins, to pass them through a huller and various screening and aspirating units for the removal of hulls, seeds, sticks, and unhulled oats, until a pure, clean groat product is obtained. Since such practice is well known, a description is believed herein unnecessary.

In one embodiment of my invention, the clean groats or clean hulled oats are subjected to 40 pounds of steam in a vessel 10 for about 10 to 12 minutes. Due to the germ of the groats having a fatty consistency, the steam does not penetrate the germ as thoroughly as the remainder of the groats. The steamed groats are passed between flaking rollers 11, and a portion of the flakes are then passed to an aspirator 12. During the actual flaking of the groats, the germ does not adhere to the body of the oat flake except at one point at the end of the flake. As the flake passes to the aspirator 12, it is cooled by the fan 13, and the small germ tends to fall away from the flake and together with fragments of the flake, etc., falls through a small germ screen 14 in the aspirator 12. Due to the oscillation of the screens, the germ is vibrated free from its attachment to the oat flake, but the germ thus obtained contains oat fragments such as oat flour and small oat

2 flakes. It is this unrefined germ stock in which the germ material is combined with flour, small oat flakes, and other fragments which has rendered separation heretofore unfeasible.

The unrefined germ stock is taken from the aspirator through line 15 and also through suction line 16, and introduced onto the vibrating screen 17.

Part of the flaked product, after leaving the flaking rollers 11, is passed through line 18 to a disintegrator 19 for the purpose of making oat flour. From the secondary discharge 20 of the disintegrator 19 we find that an unrefined germ stock is obtained similar to that obtained from the aspirator 12, and such stock is passed through line 21 to the vibrating screen structure 17. In the vibrating screen device 17 are arranged sieves or screens of different mesh. A U. S. 14-mesh screen is indicated by the numeral 22, and a 35-mesh screen is indicated by the numeral 23. The material passing over the 14-mesh screen 22 is passed into receiving tank 24. The material passing through the 14-mesh screen 22 and over the 35-mesh screen 23 is received within tank 25 and the material passing through the 35-mesh screen 23 is received within tank 26.

I then feed separately the material collected in the separate tanks 24, 25 and 26 to a gravity separator 27. The specific gravity separator is a well-known apparatus having an inclined deck on which the material is deposited through an inlet 28. The deck is vibrated and is provided with small apertures through which air may rise through the deck. Below the deck is a compartment 29 filled with air drawn inwardly through the inlets 30. Air is drawn inwardly through the inlets 30, passed preferably through a filter, and then upwardly through the openings of the deck 31 to suspend the light fragment material above the germ. By reason of its higher specific gravity, under the influence of vibration, the germ moves across the inclined deck and is received within receptacles or outlet tubes 32, 33 and 34. The oat middlings, etc. are discharged through outlets 35 and 36. Since the use of air flotation for the suspension of light material while moving a material of higher specific gravity toward a receiving point is well known, a detailed description of the machine is herein believed unnecessary. The pure germ, which travels from the inlet 28 through the longest path, is received within discharge tube 32, the 90% germ being received within tube 33, and the 50% germ within tube 34. Since this machine is of well-known construction, a detailed description herein is believed unnecessary. It will be understood that any gravity separation wherein the light fragments are floated by air while the heavier germ is moved toward a receiving chamber or outlet, may be employed. If desired, the separation may be effected by holding the material on a tilted screen over an air stream sufficient to float the light fragments from the oat germ and shaking the screen to separate the germ from the suspended fragmented flake material.

By separating the unrefined germ stock into fractions of very nearly the same size and then passing the fractions over an air flotation specific gravity separator, it is found that an extremely pure germ product is obtained. The sizes of the germ and fragment material obtained by the vibrating screen separations may vary, depending upon the type of material being treated. Instead of three separations, there may be two, or greater than three separations.

Where the flaked oats are passed to the disintegrator and an oat flour obtained, it is found that from the secondary discharge there is an unrefined germ stock product which responds very effectively to the action of the vibrating screen and the air flotation process to yield separated or pure germ material.

Specific examples of the foregoing process may be set out as follows:

*Example I*

Clean groats were heated with about 40 lbs. of steam and then passed through the flaking rollers to an aspirator equipped with a fan for cooling the rolled oats. In the aspirator, the crude germ stock was separated on vibrating screens and withdrawn therefrom and through a suction line to a vibrating screen which is known as the Selectro vibrating screen. In the screen apparatus, the material was separated on a U. S. 14-mesh wire and a U. S. 35-mesh wire, the overs of the 14-mesh wire being passed through one tank. The thrus of the 14-mesh wire and the overs of the 35-mesh wire were passed through another tank, while the thrus of the 35-mesh wire were passed through a third tank. The contents of the three tanks were then passed separately to a Sutton, Steele & Steele gravity separator, where air was introduced upon the inclined deck upon which the material was passed to suspend the light fragmented flake material while allowing the germ to move upon the vibrating screen toward an outlet. Thus by specific gravity the oat germ was separated and a substantially pure product obtained.

*Example II*

The process was carried on as described in Example I, except that part of the flaked oats were passed to a Rietz disintegrator, where the material was ground into flour, a portion of the material, however, being discharged through a secondary discharge. The latter material consisted mainly of unrefined germ stock. This stock was fed to the Selectro vibrating screen as described in Example I, and a recovery made as described in Example I.

The pure germ product obtained was found highly useful as a source of vitamins and as a food product. Further, it was found that the pure germ could be extracted and the extract used as a source of natural anti-oxidant for the prevention of rancidity in products such as corn oil, mayonnaise, etc. The germ was found to be high in phosphatides and the product useful by reason of this for several purposes. The product was also found highly useful as a health food.

While in the foregoing specification I have set forth a procedure in considerable detail for the purpose of illustrating one embodiment of the invention, it will be understood that such details of steps of procedure may be varied widely by those skilled in the art without departing from the spirit of my invention.

I claim:

1. A process for the recovery of oat germ from oats, comprising steaming and flaking hulled oats, cooling and screening the flaked oats, passing the separated germ stock containing flake fragments through a series of screens, separating the germ stock and flake fragments into a plurality of sized fractions, passing said fractions separately over an air screen having a velocity sufficient to float said fragments while leaving the germ upon the screen, and recovering the germ material remaining on said screen separately from the floated material.

2. The process of claim 1 in which the screens supporting the germ material over the air stream are shaken.

3. A process for the recovery of oat germ from oats, comprising steaming and flaking oats, disintegrating a portion of the flaked oats to obtain a flour and unrefined germ stock product, passing the unrefined germ stock product over a series of screens of different mesh to effect a separation of the stock into fractions of different sizes, passing the stock consisting of germ and flake fragments over an air stream to float the flake fragments from the germ, and collecting the germ upon a screen below said suspended fragments.

4. A process for the recovery of oat germ from oats, comprising steaming and flaking oats, disintegrating a portion of the flaked oats and separating therefrom a germ stock mixture of germ and flake fragments, cooling and screening the flaked oats to separate from the bulk an unrefined germ stock consisting of germ and fragmented flakes, passing the germ stock from the screening and disintegrating steps to a series of screens of different mesh, vibrating said screens to separate the germ stock into fractions of different sizes consisting of germ and flake fragments, passing the fractions separately over a screen maintained over an upwardly-moving air stream which suspends the flake fragments, and moving the germ upon said screen laterally to recover the same from the screen.

5. In a process for the recovery of oat germ from oats, the steps of steaming and flaking hulled oats, cooling the flaked oats to effect a partial separation of the germ from the flake, screening the material to separate from the bulk of the flakes a germ stock consisting of flake fragments and germ, segregating the germ stock into fractions of different sizes, one fraction being of a larger size than the other, and passing the fractions separately over an air stream while supporting the germ upon a screen and maintaining an air velocity in said stream sufficient to float the flake fragments, and recovering the separated germ from said screen.

6. A process for the recovery of oat germ from oats, comprising steaming and flaking hulled oats, cooling the flaked oats to effect a partial separation of the germ from the flake, screening the material to separate from the bulk of the flakes a germ stock consisting of flake fragments and germ, agitating the germ stock on screens and passing the flakes from the screens over an upwardly-moving air stream which suspends the flake fragments, and rolling the heavier germ laterally upon the screen to recover the same free of said flake fragments.

WILLIAM F. HANSER.

References Cited in the file of this patent

UNITED STATES PATENTS

| Number | Name | Date |
|---|---|---|
| 2,018,966 | Miller et al. | Oct. 29, 1935 |
| 2,347,215 | Patee | Apr. 25, 1944 |
| 2,554,873 | Musher | May 29, 1951 |

FOREIGN PATENTS

| Number | Country | Date |
|---|---|---|
| 647,085 | Great Britain | Dec. 6, 1950 |